United States Patent [19]

Lederman

[11] Patent Number: 4,541,744
[45] Date of Patent: Sep. 17, 1985

[54] UNITIZED BEARING ASSEMBLY WITH MOLDABLE RACE MEMBERS AND LABRYINTH SEAL

[75] Inventor: Frederick E. Lederman, Sandusky, Ohio

[73] Assignee: General Motors Coporation, Detroit, Mich.

[21] Appl. No.: 671,547

[22] Filed: Nov. 15, 1984

[51] Int. Cl.⁴ .................. F16C 19/10; F16C 33/38
[52] U.S. Cl. ................... 384/607; 384/614; 384/615; 280/668
[58] Field of Search ............ 384/480, 513, 523, 528, 384/607, 609, 614, 615, 621, 622, 623; 280/668, 670, 673, 692, 696, 724

[56] References Cited

U.S. PATENT DOCUMENTS

| | | | |
|---|---|---|---|
| Re. 31,184 | 3/1983 | Lederman | 280/668 |
| 3,031,239 | 4/1962 | Pitner | 384/623 |
| 3,610,387 | 10/1971 | Vom Stein | 193/37 |
| 3,649,094 | 3/1972 | Russell | 308/201 |
| 3,811,744 | 5/1974 | Wren et al. | 308/235 |
| 3,847,456 | 11/1974 | Schwarzbich | 308/217 |
| 3,957,147 | 5/1976 | Specht | 193/37 |
| 3,972,574 | 8/1976 | Pitner | 384/621 |
| 3,975,066 | 8/1976 | Hofmann et al. | 308/201 |
| 3,981,549 | 9/1976 | Carullo | 384/622 |
| 4,153,309 | 5/1979 | Markfelder et al. | 308/217 |
| 4,398,775 | 8/1983 | Hofmann et al. | 308/201 |
| 4,458,957 | 7/1984 | Greener | 308/187.1 |
| 4,497,523 | 2/1985 | Lederman | 384/613 |

Primary Examiner—Stuart S. Levy
Assistant Examiner—David Werner
Attorney, Agent, or Firm—Patrick M. Griffin

[57] ABSTRACT

An improved bearing assembly for a McPherson strut has plastic components adapted for ease of moldability that also cooperate to form a labyrinth seal as well as to unitize the assembly. Upper and lower housing members include trough shaped pathway portions and coaxial sealing grooves that together comprise a concave surface any radial cross section of which does not have a return bend relative to the bearing axis, thus allowing the race members to be molded by an axial draw mold. Each race member also includes retention tabs extending radially into the sealing grooves, backed by axial access slots to also allow the retention tabs to be molded by the same mold. A cage includes cylindrical sealing flanges, each having a convex shape similar to the concave shape of the sealing grooves, thus allowing sealing flanges to be received within respective sealing grooves with a slight clearance, so that the cage is moldable and also forms a non rubbing labyrinth seal. The sealing flanges also include retention lips formed so as to be moldable along with the cage that cooperate with the retention tabs of the housings to prevent axial separation of the components and to unitize the assembly.

3 Claims, 7 Drawing Figures

UNITIZED BEARING ASSEMBLY WITH MOLDABLE RACE MEMBERS AND LABRYINTH SEAL

This invention relates to bearings generally and specifically to an improved bearing assembly in which race members and a cage adapted for ease of moldability also cooperate to provide both unitization of the assembly and a non rubbing, labryinth seal.

Front vehicle suspensions of the type known as a McPherson strut generally include two relatively rotatable members with a bearing therebetween to give ease of rotation while transferring loads between the members. The two relatively rotatable members are generally a spring seat and an elastomer pad. The load between the spring seat and elastomer pad is primarily axial, with a smaller radial component. Therefore, the bearing is preferably a thrust-type bearing having a complement of rolling bearing elements received between a pair of race members spaced to either axial side of the complement. Parts of the elastomer pad or spring seat, or both, will often wrap around the race members and extend past the axial space between the race members. Therefore, it is desirable that no part of any component of the bearing extend radially out through that axial space where it could interfere with the relative rotation. Also, it is generally necessary in such an environment that contaminants from the ambient, such as road dust and water, be excluded from the bearing elements. It is also desirable, if possible, that the compononents of the bearing comprise a unitized assembly, that is, one in which the components are retained against axial separation prior to installation of the bearing assembly into the suspension. And it is preferable, of course, that the bearing be made as economically and with as few parts as possible.

The U.S. application Ser. No. 470,158, now U.S. Pat. No. 4,497,523, assigned to the assignee of the present invention, discloses a bearing assembly for McPherson strut in which a metal upper housing member and a plastic lower housing member enclose a pair of bearing races, which in turn enclose a complement of bearing balls and a pair of seals. While there is no direct rubbing contact between the elastomer mount and the upper spring seat, or between the housing members and races, the seals do rub between the races. It would be desirable, if possible, to eliminate the rubbing seals while still sealing the bearing and also providing unitization and ease of manufacture and assembly.

The U.S. Pat. Nos. 3,811,744 to Wren et al, and 3,847,456 to Schwarzbich, both show thrust bearings in which a pair of race members snap fit with flanges on a roller cage that extend radially out through the axial space between the races and wrap over the outside of the races. Thrust bearings of this type are unsuitable for the environment discussed above because of the potential for rubbing on the spring seat or elastomer pad. In addition, parts of the cage are designed to rub on the race members, either because of the snap fit therewith or by a deliberate rubbing engagement.

The Greener U.S. Pat. No. 4,458,957 shows a pair of plastic housings enclosing bearing races in which portions of the housings provide a non rubbing, labryinth seal. The bearing disclosed, however, is a radial bearing that has races disposed to either radial side of the complement of bearing balls, not to either axial side thereof. As such, the races are already retained against axial separation by virtue of the fact that the ball complement is wrapped in the axial direction by the ball pathways ground into the races. Therefore, retention of the housings against axial separation may be easily achieved simply by joining the housings to the bearing races. This is not possible with the preferred type of bearing for the environment discussed above. Further, one housing is joined to a race by snap fingers that have a return bend relative to the bearing axis. This would make it difficult or impossible to mold that housing by an axial draw mold, one with only two mold elements movable parallel to the bearing axis.

SUMMARY OF THE INVENTION

The present invention provides an improved unitized bearing assembly in which a pair of race members and a cage adapted for ease of moldability also cooperate with one another to both retain the race members and cage together against axial separation, as well as to provide a non rubbing labryinth seal.

The bearing assembly includes a pair of plastic race members, each having a pathway portion with a complement of bearing balls received between the pathway portions, with the race members spaced axially to either side of the ball complement. Each race member also includes a pair of circular sealing grooves, one on either radial side of the pathway portion and coaxial therewith. The pathway portion and sealing grooves in each race member are shaped such that they comprise a concave surface any radial cross-section of which does not have a return bend relative to the bearing axis. This allows the race members to be molded simply by a single pair of mold elements that move parallel to the bearing axis. The race members are identical, and the sealing grooves in each are therefore axially opposed to one another.

The ball complement is retained by a plastic bearing cage having an annular web with pockets that receive the bearing balls. Cylindrical sealing flanges at the radially inner and radially outer terminus of the web extend axially to either side of the cage and are coaxial with the bearing axis. The sealing flanges have a convex surface shaped similarly to the concave shape of the sealing grooves, so that any radial cross-section through the web and the sealing flanges also has no return bends relative to the bearing axis. This similar, complementary shaping of the sealing grooves and sealing flanges allows the cage to be molded similarly to the race members, and also allows the sealing flanges to fit within the sealing grooves with a slight clearance therebetween. This clearance provides the convoluted path of a non rubbing labryinth seal to both exclude contaminants from outside the bearing and to substantially retain lubricant around the ball complement.

In addition, the sealing flanges and sealing grooves cooperate to retain the cage and race members together while still maintaining ease of moldability and the non rubbing seal. Each sealing flange of the cage also includes a retention lip that extends radially therefrom into its respective sealing groove. The retention lips are designed to cover an area the projection of which, upon a plane through the centers of the bearing elements, is separate and distinct from the projections of the other retention lips. In one embodiment, the cage includes a continuous retention lip on each sealing flange, with the two continuous lips being axially opposed to one another at the radially innermost and radially outermost extent of the cage. In another embodiment, discontinuous retention lips on the same radial side of the cage are axially opposed and alternate with one another so as to have no circumferential overlap. Both embodiments, therefore, may be molded with the cage by the same pair of mold elements.

Each race member also includes a circumferentially spaced series of retention tabs that extend radially into the sealing grooves, radially past the respective retention lips and axially spaced therefrom. The retention tabs are sufficient in number and circumferentially spaced such that there is always an interference or blocking between the retention lips and retention tabs on each axial side of the cage. This serves to retain the race members and the cage together against axial separation, giving a unitized assembly. In addition, each retention tab has a matching, axially directed access slot that runs through the race member to the retention tab to also allow the retention tabs to be molded along with the race members by the same pair of mold elements. The axially spaced retention lips and retention tabs do not engage when the bearing is under load, so as not to interfere with the non rubbing labryinth seal. In addition, the retention tabs are identical on each race member so that either race member be placed on either axial side of the cage at assembly.

It is, therefore, an object of the invention to provide an improved, unitized bearing assembly in which a cage and a pair of race members adapted for ease of moldability also cooperate both to retain the race members to the cage and to provide a non rubbing labyrinth seal.

It is another object of the invention to provide an improved bearing assembly of the type described in which axially extending sealing flanges on the cage and respective sealing grooves coaxial with pathway portions of the race members have similar convex and concave radial cross sections with no return bends relative to the bearing axis, so that the cage and race members each may be molded by a single pair of mold elements movable parallel to the bearing axis, and so that the sealing flanges may fit within the sealing grooves with a slight, non rubbing clearance to provide a labyrinth seal, while moldable retention tabs on the races and moldable retention lips on the sealing flanges cooperate to provide retention of the race members and cage together.

It is yet another object of the invention to provide an improved bearing assembly of the type described in which the retention lips are moldable by virtue of having an area the projection of which upon a plane through the centers of the bearing elements, is separate and distinct from the projection of the other retention lips, and in which the retention tabs have matching axially directed access slots through the race members, to allow the retention tabs to also be molded along with the cage and the race members by the same pair of mold elements.

DESCRIPTION OF THE PREFERRED EMBODIMENT

These and other objects and advantages of the invention will appear from the following written description and drawings in which.

Figures 1, 2:
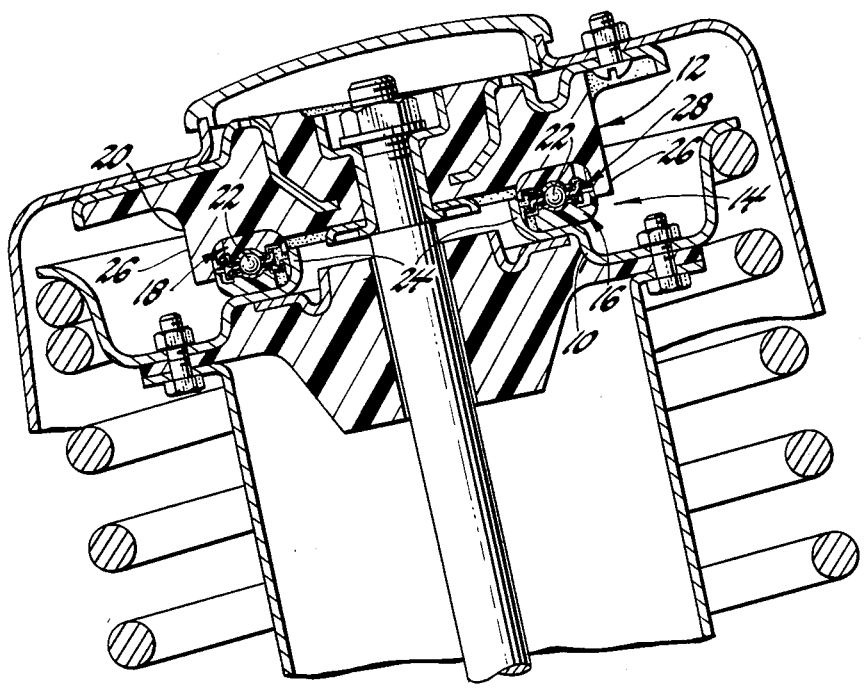
FIG. 1 is a cross-sectional view through the top of McPherson strut showing the improved bearing assembly of the invention in place.
FIG. 2 is an enlarged portion of FIG. 1 showing details of the bearing assembly of the invention.

Referring first to FIG. 1, a McPherson strut includes two relatively rotatable members, an upper spring seat 10 that turns with the vehicle steering system and a resilient mount designated generally at 12 that is rigid to the vehicle. The first two basic components of the improved bearing assembly of the invention, designated generally at 14, are a lower race member 16 that seats on the upper spring seat 10 and an upper race member 18 that seats in a pocket of an elastomer pad 20 of resilient mount 12. Rolling bearing elements, bearing balls 22 in the embodiment disclosed, are disposed in a circular complement between the first two basic components of assembly 14, lower and upper race members 16 and 18, which are spaced axially to either side of balls 22. The vehicle load transferred from upper spring seat 10, through bearing assembly 14 and to resilient mount 12 is primarily axial, so that the lower and upper race members 16 and 18 are loaded axially toward one another when assembly 14 is installed, as shown.

Referring next to FIG. 2, the third basic component of bearing assembly 14 is a cage, designated generally at 28, which separates and retains bearing balls 22 and retains lower and upper race members 16 and 18 together against axial separation before assembly 14 is installed. It may also be seen, in FIG. 1, that an inner flange 24 of upper spring seat 10 and an outer lip 26 of elastomer pad 20 both extend axially beyond the axial gap between lower and upper race members 16 and 18. This extension past the gap helps to shield bearing balls 22 from contamination by road dust and water.

Figure 3:
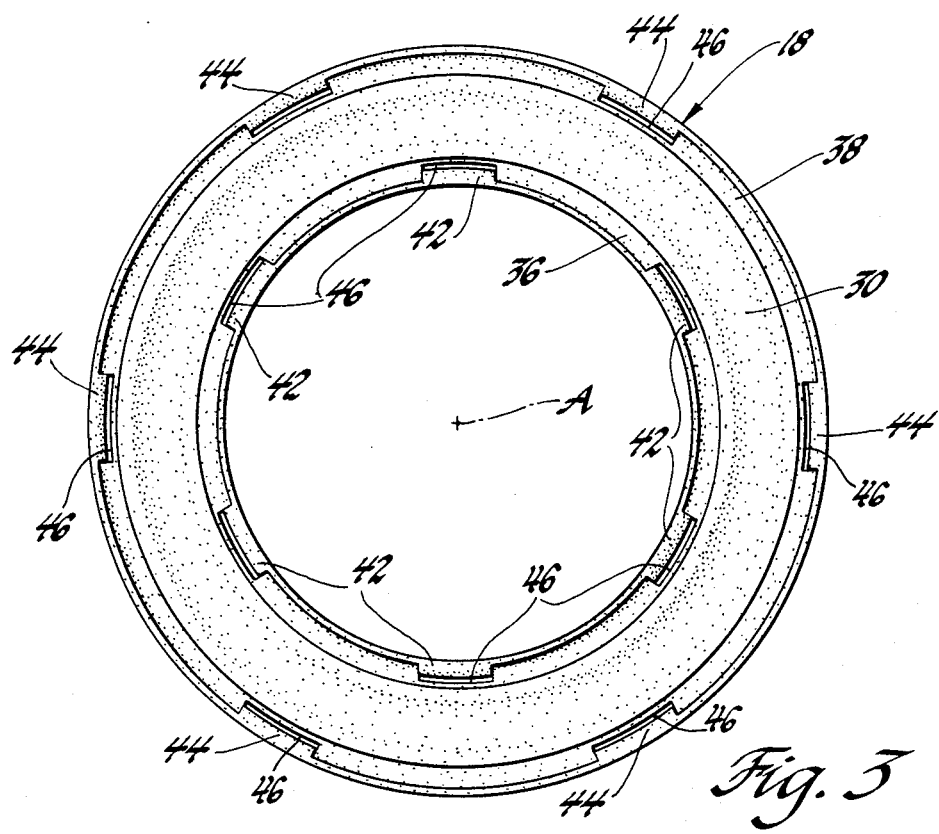
FIG. 3 is a plan view looking axially into one of the race members, as indicated at 3—3 in FIG. 4.
Figure 4:
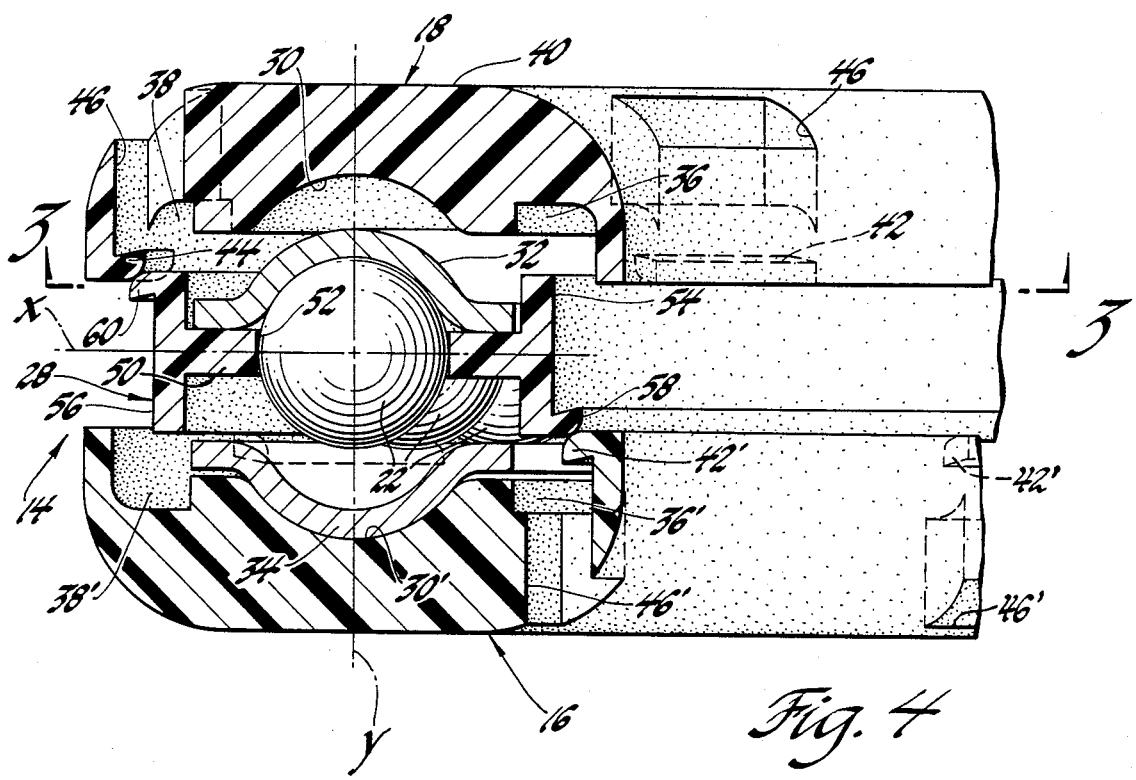
FIG. 4 is a view of the bearing assembly of the invention being assembled.

Details of the lower and upper race members 16 and 18 may be best seen in FIGS. 3 and 4. Since they are identical, only upper race member 18 will be described in detail, and the designations lower and upper will be dropped, except where useful. Race member 18 is molded of fiber filed nylon or other suitable material, and is designed to be simply moldable. That is, the race member 18 may be molded by an axial draw mold, one having a single pair of mold elements that move parallel to the bearing axis. The line marked Y in FIG. 4 is parallel to the bearing axis, which runs through the point A of FIG. 3. Therefore, race member 18 may be described in relation to the line Y as well as in relation to the bearing axis. Race member 18 includes a pathway portion 30, basically a circular trough, that is coaxial with the bearing axis and symmetrical in cross-section about the line Y. Pathway portion 30 is not referred to as a pathway as such, because it actually serves as a seat for a metal race 32, which directly engages the complement of balls 22 to provide a pathway therefore. Identical metal race 34 provides the other pathway for balls 22. However, most broadly, pathway portion 30 might, if formed from another material, directly engage balls 22, or race 32 might somehow be made integral with pathway portion 30. For that same reason, race member 18 is not referred to as a race per se, and could be considered a housing member, since it does not directly engage balls 22. The structural cooperation of race members 16 and 18 with the metal races 32 and 34 is the subject of the separate application referred to above, and not further discussed here. It is to be understood that it is the race members 16 and 18 and their cooperation with cage 28 that most broadly constitute the invention described here.

Referring to FIG. 4, race member 18 also includes a radially inner and a radially outer sealing groove, 36 and 38 respectively, coaxial with pathway portion 30. Sealing grooves 36 and 38 are identical in cross section, and they comprise, together with pathway portion 30, a concave surface any radial cross section of which does not have a return bend or an undercut relative to line Y, that is, relative to the bearing axis. Therefore, pathway portion 30 and sealing grooves 36 and 38 may be molded together by one of a single pair of mold elements moveable parallel to the bearing axis to form essentially one entire side of race member 18, the side facing axially inwardly toward balls 22. Similarly, the axially outwardly facing side 40 of race member 18 also has no return bends, and may be molded by the other of the single pair of mold elements.

Referring next to FIG. 3, race member 18 also includes a series of six evenly circumferentially spaced retention tabs 42 extending radially outwardly into sealing groove 36 and six identically shaped retention tabs 44 extending radially inwardly into sealing groove 38. Retention tabs 42 and 44 alternate circumferentially, so that the radial cross-section through upper race member 18 that is shown in FIG. 4 shows only the retention tab 44, with the position of retention tab 42 being shown in dotted lines. Both retention tabs 42 and 44 have a general hook shape with a rounded outer edge, and do clearly have a return bend relative to the bearing axis. Therefore, a special provision is necessary to allow retention tabs 42 and 44 to be molded with race member 18 by the same, single pair of mold elements. Each retention tab 42 and 44 is provided with a matching, axially directed access slot 46, so that the return bend portions of retention tabs 42 and 44, that is, the portions that face axially outwardly, may be molded by an axially extending part of the same mold element that forms the axially outwardly facing side 40. Access slot 46 is left by that part of the mold element during the molding process, and has an area slightly larger than retention tabs 42 or 44, as may be seen in FIG. 3. The axially inwardly facing portions of retention tabs 42 and 44 are formed by the same mold element that forms pathway portion 30 and sealing grooves 36 and 38.

Lower race member 16 is identical to upper race member 18, and similar parts are given the same number with a prime, and not further described. As lower and upper race members 16 and 18 are identical, the sealing grooves 36, 36' and 38, 38' are axially opposed to one another. This identity is not necessary in the broadest sense of the invention. Nor is it necessary, in the broadest sense, that there be two sealing grooves in each race member, just one in each race member, so as to cooperate with a third component of bearing assembly 14, described below. However, it is desirable, as a practical matter, that there be two pairs of radially and axially opposed sealing grooves, 36' and 38, and 36 and 38', for reasons discussed below. The pathway portions 30 and 30' would, of course, have to be axially opposed to one another, regardless, in order to receive the bearing balls 22 therebetween.

Figure 5:
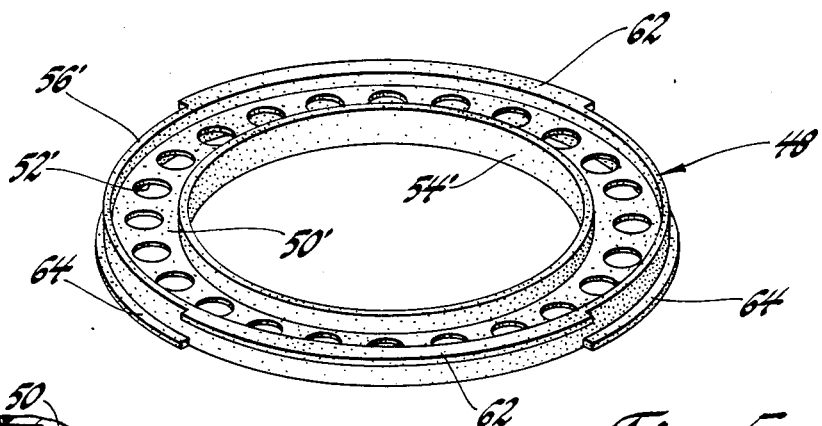
FIG. 5 is a perspective view of the cage of another embodiment of the invention.

The third basic component of assembly 14 is a cage, one embodiment 28 of which may be seen in FIG. 4 and another embodiment 48 of which may be seen in FIG. 5. Referring first to FIG. 2, cage 28 includes a planar annular web 50 which is symmetrical about a plane, shown by the dotted line X, that lies through the centers of bearing balls 22. Web 50 has a plurality of evenly circumferentially spaced, straight-sided ball pockets 52, which retain balls 22, forming a slight radial gap therewith. At the radially inner and radially outer terminus of web 50, integrally molded sealing flanges 54 and 56 extend axially to either side of web 50, each cylindrical in shape and coaxial with the bearing axis. Since they do extend to either axial side of web 50, each axial side of sealing flanges 54 and 56 may be thought of as one of a pair of flanges with the same radius. Each axial side of the sealing flanges 54 and 56 has a convex surface shaped substantially similarly to the concave shape of the sealing grooves 36, 36' and 38, 38', with no return bends. Sealing flanges 54 and 56 may, therefore, also be molded along with web 50 and the straight-sided pockets 52 by a single pair of mold elements.

In addition, because of this similar, complementary shaping, sealing flanges 54 and 56 are receivable within sealing grooves 36, 36' and 38, 38' with a slight radial and axial clearance. The radial clearance is maintained by the smaller radial clearance between ball pockets 52 and bearing balls 22. The axial clearance is maintained by the smaller axial clearance between web 50 and the metal races 32 and 34. Therefore, not only are the sealing flanges 54 and 56 and the respective sealing grooves 36, 36' and 38, 38' easily moldable, they cooperate to form the tortuous or convoluted path of a non rubbing labryinth seal. This helps to prevent the entrance of contaminants from the ambient through the axial gap between race members 16 and 18. In addition, since the bearing assembly 14 is used in a low speed application, the labryinth seal is effective to substantially prevent the excursion of any lubricant that may be used around bearing balls 22. It will be noted that the radial clearance between the radially innermost and radially outermost walls of flanges 54 and 56 and the respective sealing grooves 36, 36' and 38, 38' is relatively larger than the other radial clearances. This is to allow for the retention of the components of bearing assembly 14, described next.

Referring again to FIG. 4, one axial side of sealing flange 54 includes a continuous retention lip 58 extending radially inwardly therefrom. The axially opposed side of sealing flange 56 has a continuous retention lip 60 extending radially outwardly therefrom. Each retention lip 58 and 60 has generally a hook shape in cross-section with a rounded edge, similar to the cross-sectional shape of retention tabs 42 and 44. Since retention lips 58 and 60 comprise the radially innermost and radially outermost extent respectively of cage 28, they do not axially overhang any part of the sealing flanges 54 and 56. Stated differently, the projections of retention lips 58 and 60 upon the plane represented by the line X are separate and distinct. This allows the retention lips 58 and 60 to be molded along with cage 28 by the same single pair of mold elements.

Referring next to FIG. 2, it will be seen that in the finished assembly 14, the retention lip 58 extends radially past and is slightly axially spaced from the retention tabs 42' of lower race member 16. The retention lip 60 extends radially past and is slightly axially spaced from the retention tabs 44 of upper race member 18. The relatively larger radial spacing referred to above allows for this radial extension. Referring back to FIG. 4, it will be seen that during assembly of the components, the rounded edges of the respective retention tabs and retention lips 42' and 58 and 44 and 60 resiliently snap past one another to the assembled position of FIG. 2. Retention lips 58 and 60 are, in effect, diagonally opposed relative to the balls 22, and may flex independently. The axial overlap or blocking of the retention lips 58 and 60 with their respective retention tabs 42' and 44 prevents axial separation of the lower and upper race members 16 and 18 from the FIG. 2 position when the bearing assembly 14 is not under load, such as during shipping or handling.

Figure 6:
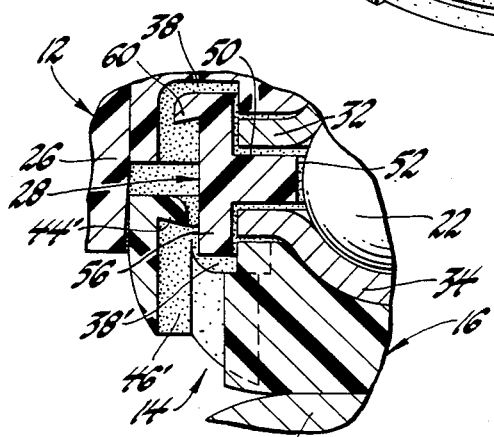
FIG. 6 is a view of a portion of a cross-sectional view similar to that of FIG. 2, but with the race members in a different relative rotated position.

Most broadly, those axial sides of the sealing flanges 54 and 56 that are receivable within one of the two radially and axially opposed pairs of sealing grooves, 36 and 38', serve no part in the retention, but they do form part of the labyrinth seal. Consequently, the retention tabs 42 and 44' serve no function in the retention, being present only because lower and upper race members 16 and 18 are identical. That identity, however, gives economy of molding and the ability to interchange race members 16 and 18, or, stated differently, to put cage 28 in either way. Since retention lips 58 and 60 are continuous, it will be understood that as few as one of each of the functional retention tabs 42' and 44 could be sufficient to prevent that axial separation. But more are used to give secure retention. In addition, as may be seen in FIG. 6, the access slots 46' that match the retention tabs 44' of lower race member 16, may also serve to drain any contaminants that enter the sealing groove 38'. This is an additional advantage that flows from structure already present for other purposes. The access slots 46 in upper race member 18, of course, will be blocked by the elastomer pad 20, as seen in FIG. 2.

A second embodiment of the cage, 48, is shown in FIG. 5, with similar parts numbered with the same numbers with a prime. The retention lips are different. One axial side of the radially outer sealing flange 56' includes two discontinuous retention lips 62, each covering approximately 90 degrees. The opposed axial side of sealing flange 56' includes two other discontinuous retention lips 64, each also covering approximately 90 degrees and alternating circumferentially with the retention lips 62. The lack of circumferential overlap of the axially opposed retention lips 62 and 64 assures that their projections upon a plane through the centers of the bearing balls 22 will be separate and distinct. Therefore, all of cage 48 may also be molded by a single pair of mold elements moveable parallel to the bearing axis.

Figure 7:
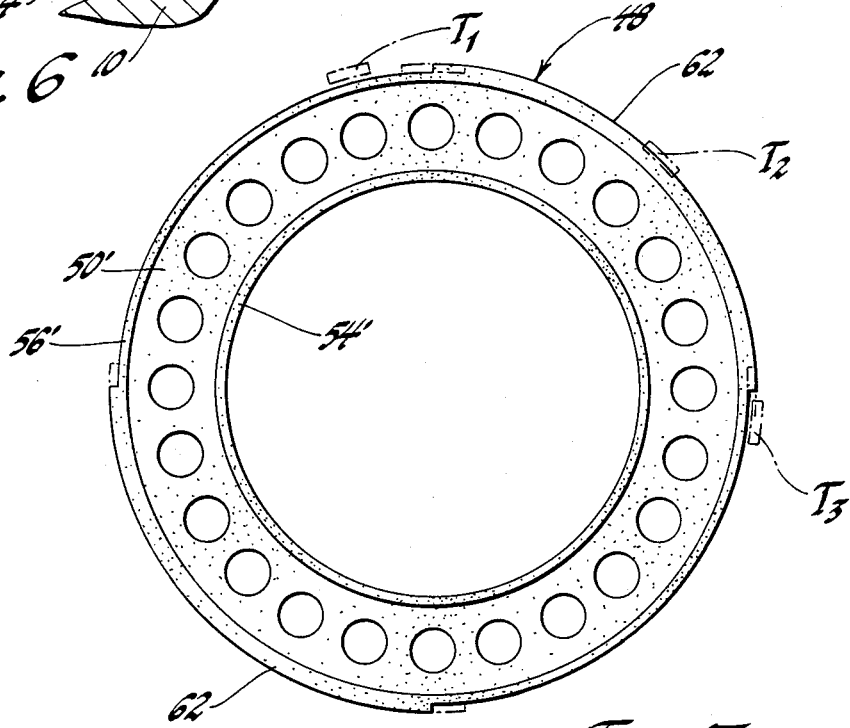
FIG. 7 is a diagramatic plan view of the cage of FIG. 5 showing the cooperation of the retention tabs and the retention lips.

More than one retention tab would be minimally necessary in conjunction with the second embodiment 48, as may be seen in FIG. 7. In FIG. 7, three retention tabs, designated T1, T2 and T3, are shown diagramatically in relation to a retention lip 62. For purposes of clarity, only one set of retention tabs and retention lips 62 are illustrated, as the others would work similarly. What is minimally necessary to prevent axial separation is that two retention tabs, T1 and T2, be within the smallest angle subtended by the retention lip 62, in this case within 90 degrees, while the other retention tab T3 must be angularly spaced from tab T1 by greater than that amount, greater than 90 degrees apart in this case. Then, a retention tab T1, T2 or T3 will always axially block a retention lip 62.

It will be appreciated that the radially inner sealing flange 54' could fit within a pair of sealing grooves narrower than 36 and 36', since it has no retention lips to be accommodated, and serves only as part of the labyrinth seal. However, the cage 48 could also work in conjunction with the lower and upper race members 16 and 18 shown in FIG. 4, with the retention tabs 42 and 42' being non functional. Also, more than the minimally necessary retention tabs could be used. For example, the six circumferentially spaced retention tabs 44 and 44' on race members 16 and 18 would work in conjunction with the second embodiment of the cage 48. Thus, the two different embodiments of the cage could be used with the same race members. Additionally, the retention lips 62 and 64 could be molded on the radially inner sealing flange 54' and the retention tabs 42 and 42' would then become functional.

Therefore, it will be seen that the basic components of the invention give ease of moldability, a non rubbing labyrinth seal and retention against axial separation. Making the race members identical creates some redundant parts, but gives the added advantage of symmetry and consequent ease of assembly. In addition, in the environment disclosed, structure already present in the invention aids in the shedding of contaminants entering from outside the bearing assembly. It is to be understood that the invention may be embodied in structures other than those disclosed, as not intended to be so limited.

The embodiments of the invention in which an exclusive property or privilege is claimed are defined as follows:

1. An improved bearing assembly to support a load that is at least partially axial having rolling bearing elements retained by a cage in a circular complement about a bearing axis and received between the pathway portions of a pair of race members spaced to either axial side of said complement, said cage and race members of said improved bearing assembly being adapted for ease of moldability as well as cooperating to provide retention of said race members to said cage and a non rubbing labyrinth seal, comprising, a substantially circular sealing groove formed in each race member coaxially to the pathway portion thereof, said pathway portion and sealing groove in each race member comprising together a concave surface any radial cross section of which does not have a return bend relative to the bearing axis, so that each race member may be molded by a single pair of mold elements moveable parallel to the bearing axis, sealing flanges extending to either axial side of said cage, one respective to and receivable within each sealing groove and having a convex surface shaped similarly to the concave surface of its respective sealing groove, so that said cage may also be molded in similar fashion to the race members and so that said sealing flanges may be sized to be received within their respective sealing grooves with a slight clearance therebetween, at least one retention lip extending radially from each sealing flange into the respective sealing groove, each retention lip covering an area the projection of which upon a plane through the center of the bearing elements is distinct and separate from that of the other retention lips so that said retention lips may be molded with the cage by the same pair of mold elements, retention tabs extending radially from each race member into said sealing grooves radially past and axially spaced from the respective retention lips received within said sealing grooves, each retention tab having a matching axially directed access slot so that said retention tabs may be molded with the races by the same pair of mold elements, said retention tabs being sufficient in number and circumferentially spaced relative to said sealing grooves so as to block the respective retention lips at every relative rotated position of the race members and cage, whereby the respective retention tabs and lips cooperate to retain said race members to said cage to prevent axial separation when the bearing is not supporting a load, while the respective moldable sealing grooves and sealing flanges receivable therewithin cooperate to form a convoluted path and a labyrinth seal without rubbing between the sealing flanges and grooves when the bearing is supporting a load.

2. An improved bearing assembly to support a load that is at least partially axial having rolling bearing elements retained by a cage in a circular complement about a bearing axis and received between the pathway portions of a pair of race members spaced to either axial side of said complement, said cage and race members of said improved bearing assembly being adapted for ease of moldability as well as cooperating to provide retention of said race members to said cage and a non rubbing labyrinth seal, comprising, a substantially circular sealing groove formed in one race member coaxially to said pathway portion on the radially outer side of said bearing element complement, with the other of said race members also including a sealing groove on the radially inner side of said complement radially and axially opposed to the sealing groove in the one race member, said pathway portion and sealing grooves in each race member comprising together a concave surface any radial cross section of which does not have a return bend relative to the bearing axis, so that each race member may be molded by a single pair of mold elements moveable parallel to the bearing axis, sealing flanges extending to either axial side of said cage, one respective to and receivable within each sealing groove and having a convex surface shaped similarly to the concave surface of its respective sealing groove, so that said cage may also be molded in similar fashion to the race members and so that said sealing flanges may be sized to be received within their respective sealing grooves with a slight clearance therebetween, a continuous retention lip extending radially from each sealing flange into its respective sealing groove, said retention lip on the sealing flange receivable within the sealing groove in said one race member and said retention lip on the sealing flange receivable within the sealing groove in said other race member comprising the radially outermost and radially innermost extent respectively of said cage so that said retention lips may be molded with the cage by the same pair of mold elements, at least one retention tab extending radially from each race member into said sealing grooves radially past and axially spaced from the respective retention lips received within said sealing grooves, each retention tab having a matching axially directed access slot so that said retention tabs may be molded with the races by the same pair of mold elements, whereby the respective retention tabs and lips cooperate to retain said race members to said cage to prevent axial separation when the bearing is not supporting a load, while the respective moldable sealing grooves and sealing flanges receivable therewithin cooperate to form a convoluted path and a labyrinth seal without rubbing between the sealing flanges and grooves when the bearing is supporting a load.

3. An improved bearing asembly to support a load that is at least partially axial having rolling bearing elements retained by a cage in a circular complement about a bearing axis and received between the pathway portions of a pair of race members spaced to either axial side of said complement, said cage and race members of said improved bearing assembly being adapted for ease of moldability as well as cooperating to provide retention of said race members to said cage and a non rubbing labryinth seal, comprising, a substantially circular sealing groove formed in each race member coaxially to the pathway portion thereof, said pathway portion and sealing groove in each race member comprising together a concave surface any radial cross section of which does not have a return bend relative to the bearing axis, so that each race member may be molded by a single pair of mold elements moveable parallel to the bearing axis, sealing flanges extending to either axial side of said cage, one respective to and receivable within each sealing groove and having a convex surface shaped similarly to the concave surface of its respective sealing groove, so that said cage may also be molded in similar fashion to the race members and so that said sealing flanges may be sized to be received within their respective sealing grooves with a slight clearance therebetween, at least one retention lip extending radially from each sealing flange into the respective sealing groove, said retention lips on said sealing flanges circumferentially alternating relative to each other so that said retention lips may be molded with the cage by the same pair of mold elements, retention tabs extending radially from each race member into said sealing grooves radially past and axially spaced from the respective retention lips received within said sealing grooves, each retention tab having a matching axially directed access slot so that said retention tabs may be molded with the races by the same pair of mold elements, said retention tabs being sufficient in number and circumferentially spaced relative to said sealing grooves so as to block the respective retention lips at every relative rotated position of the race members, whereby the respective retention tabs and lips cooperate to retain said race members to said cage to prevent axial separation when the bearing is not supporting a load, while the respective moldable sealing grooves and sealing flanges receivable therewithin cooperate to form a convoluted path and a labyrinth seal without rubbing between the sealing flanges and grooves when the bearing is supporting a load.

* * * * *